United States Patent
Jayasuriya et al.

(10) Patent No.: US 9,963,099 B2
(45) Date of Patent: May 8, 2018

(54) STEERING WHEEL ASSEMBLY INCLUDING AN AIRBAG TETHER

(71) Applicant: Ford Global Technologies, LLC, Dearborn, MI (US)

(72) Inventors: Mangala A. Jayasuriya, Bloomfield Hills, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/006,383

(22) Filed: Jan. 26, 2016

(65) Prior Publication Data
US 2017/0210325 A1    Jul. 27, 2017

(51) Int. Cl.
| | | |
|---|---|---|
| *B60R 21/203* | (2006.01) | |
| *B60R 21/2338* | (2011.01) | |
| *B60R 21/235* | (2006.01) | |
| *B62D 1/11* | (2006.01) | |

(52) U.S. Cl.
CPC .......... *B60R 21/203* (2013.01); *B60R 21/235* (2013.01); *B60R 21/2338* (2013.01); *B62D 1/11* (2013.01); *B60R 2021/23382* (2013.01); *B60R 2021/23388* (2013.01); *B60R 2021/23504* (2013.01)

(58) Field of Classification Search
CPC .................... B60R 21/203; B60R 2021/23386
See application file for complete search history.

(56) References Cited

U.S. PATENT DOCUMENTS

| | | | |
|---|---|---|---|
| 3,801,123 A | 4/1974 | Jira | |
| 3,879,056 A * | 4/1975 | Kawashima | B60R 21/233 280/743.2 |
| 5,277,440 A * | 1/1994 | Jackson, Jr. | B60R 21/16 280/727 |
| 5,626,358 A * | 5/1997 | Ricks | B60Q 5/003 200/61.54 |

(Continued)

FOREIGN PATENT DOCUMENTS

| | | | |
|---|---|---|---|
| FR | 2950843 A1 | 4/2011 | |
| GB | 2498439 A | 7/2013 | |

(Continued)

OTHER PUBLICATIONS

UKIPO Search Report for GB Application No. GB1701275.8 dated Sep. 18, 2017 (3 pages).

(Continued)

*Primary Examiner* — James A English
(74) *Attorney, Agent, or Firm* — Frank A. MacKenzie; Bejin Bieneman PLC

(57) ABSTRACT

A steering wheel assembly for a vehicle includes a steering wheel and an airbag that is supported by the steering wheel. The airbag is inflatable away from the steering wheel in an inflation direction. An airbag tether includes a first end coupled to the steering wheel, and a second end spaced from the first end and coupled to the steering wheel. The airbag is disposed between the steering wheel and the airbag tether. During a frontal impact of the vehicle, the airbag tether may be positioned independent of steering wheel position to restrict inflation of the airbag adjacent a thorax of a driver of the vehicle.

12 Claims, 6 Drawing Sheets

(56) References Cited

U.S. PATENT DOCUMENTS

| | | | |
|---|---|---|---|
| 5,678,858 A | 10/1997 | Nakayama et al. | |
| 6,203,055 B1* | 3/2001 | Mouws | B60R 21/16 280/727 |
| 6,264,235 B1 | 7/2001 | Battermann | |
| 6,454,300 B1 | 9/2002 | Dunkle et al. | |
| 6,471,241 B1 | 10/2002 | Toland | |
| 6,745,861 B2* | 6/2004 | Hare | B60R 21/16 180/271 |
| 6,883,831 B2* | 4/2005 | Hawthorn | B60R 21/16 280/739 |
| 7,793,976 B2* | 9/2010 | Kuroe | B60R 21/231 280/730.1 |
| 7,793,978 B2* | 9/2010 | Vigeant | B60R 21/233 280/732 |
| 8,042,832 B2 | 10/2011 | Kim | |
| 8,491,007 B2* | 7/2013 | Aekbote | B60R 21/2338 280/734 |
| 9,550,465 B1* | 1/2017 | El-Jawahri | B60R 21/01512 |
| 2004/0094941 A1 | 5/2004 | Waid et al. | |
| 2004/0207186 A1 | 10/2004 | Kai | |
| 2004/0212186 A1* | 10/2004 | Kai | B60R 21/237 280/743.2 |
| 2006/0220360 A1* | 10/2006 | Ridolfi | B62D 1/105 280/731 |
| 2010/0019473 A1* | 1/2010 | Dennis | B60R 21/206 280/729 |
| 2010/0175499 A1* | 7/2010 | Thomas | B60R 21/2032 74/552 |
| 2013/0093171 A1 | 4/2013 | Eckert | |
| 2013/0276571 A1* | 10/2013 | Takayasu | B62D 1/105 74/552 |
| 2015/0054262 A1 | 2/2015 | Kwon | |
| 2015/0232056 A1* | 8/2015 | Miron | B60R 21/2338 280/735 |
| 2017/0210325 A1* | 7/2017 | Jayasuriya | B60R 21/203 |

FOREIGN PATENT DOCUMENTS

| | | |
|---|---|---|
| GB | 2511395 A | 9/2014 |
| KR | 1998021627 | 6/1998 |
| KR | 100641033 | 10/2006 |
| KR | 100641033 B1 | 10/2006 |

OTHER PUBLICATIONS

UKIPO Search Report for GB Application No. GB1701275.8 dated Jul. 7, 2017 (5 pages).

* cited by examiner

STEERING WHEEL ASSEMBLY INCLUDING AN AIRBAG TETHER

BACKGROUND

Vehicles may include a variety of airbags deployable during vehicle impacts to absorb energy from occupants of the vehicles during the impact. The airbag may be a component of an airbag assembly including a base supporting the airbag, and an inflation device in communication with the airbag for inflating the airbag from an uninflated position to an inflated position. The airbag assemblies may be supported on a steering wheel of the vehicle.

Vehicles are subject to a variety of impact tests. These impact tests may include those standardized by the National Highway Traffic and Safety Agency (NHTSA). These impact tests may include, for example, a front crash test, an oblique impact test, etc. In these tests, a test dummy seated in a driver seat of the vehicle may be urged forwardly and toward the steering wheel of the vehicle. There is an opportunity to design a steering wheel assembly that provides occupant protection regardless of the steering wheel position.

DETAILED DESCRIPTION

Figure 1:
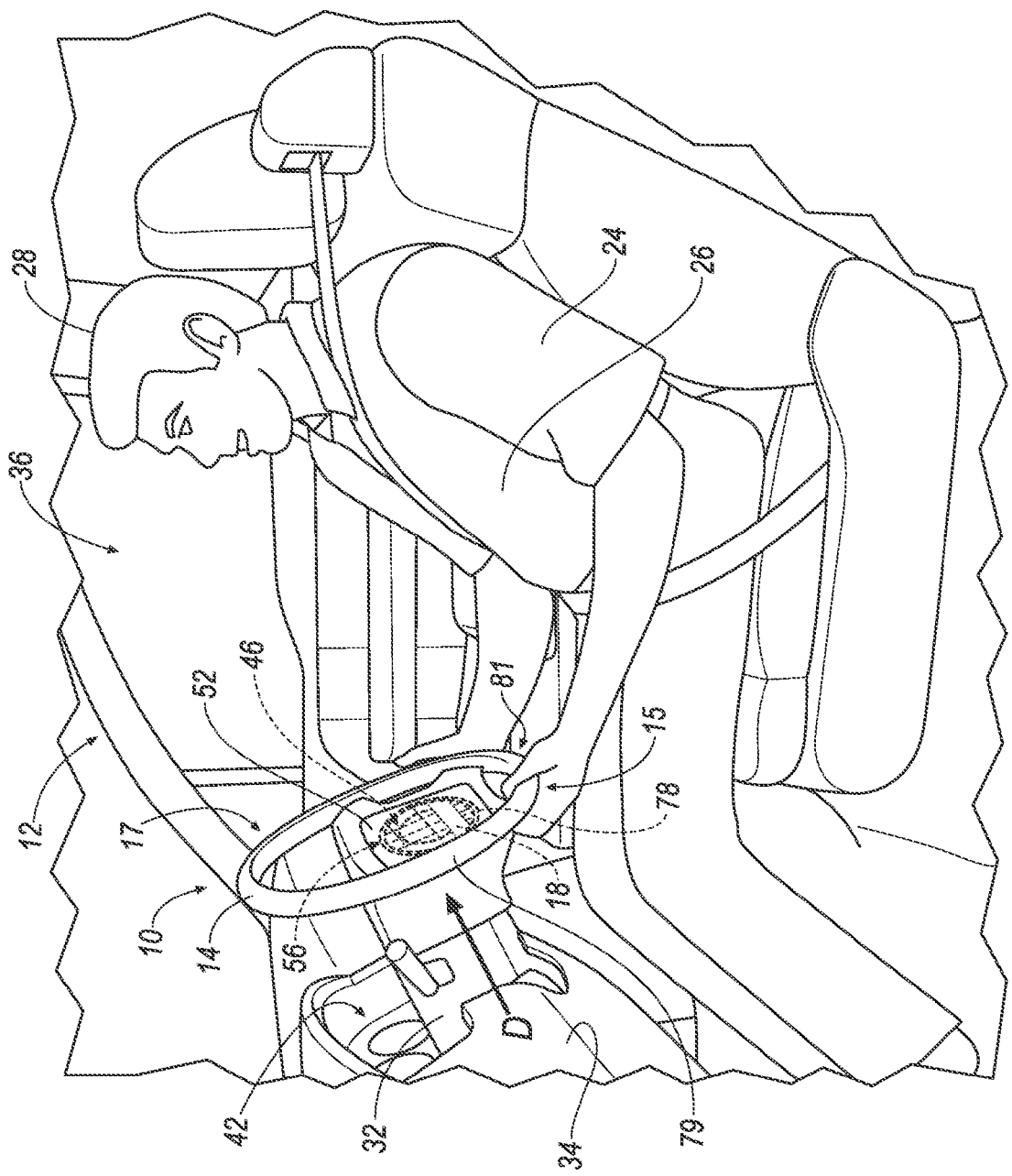
FIG. 1 is a perspective view of a portion of a vehicle including a steering wheel assembly including both an airbag assembly and a tether assembly in hidden lines.
Figure 2:
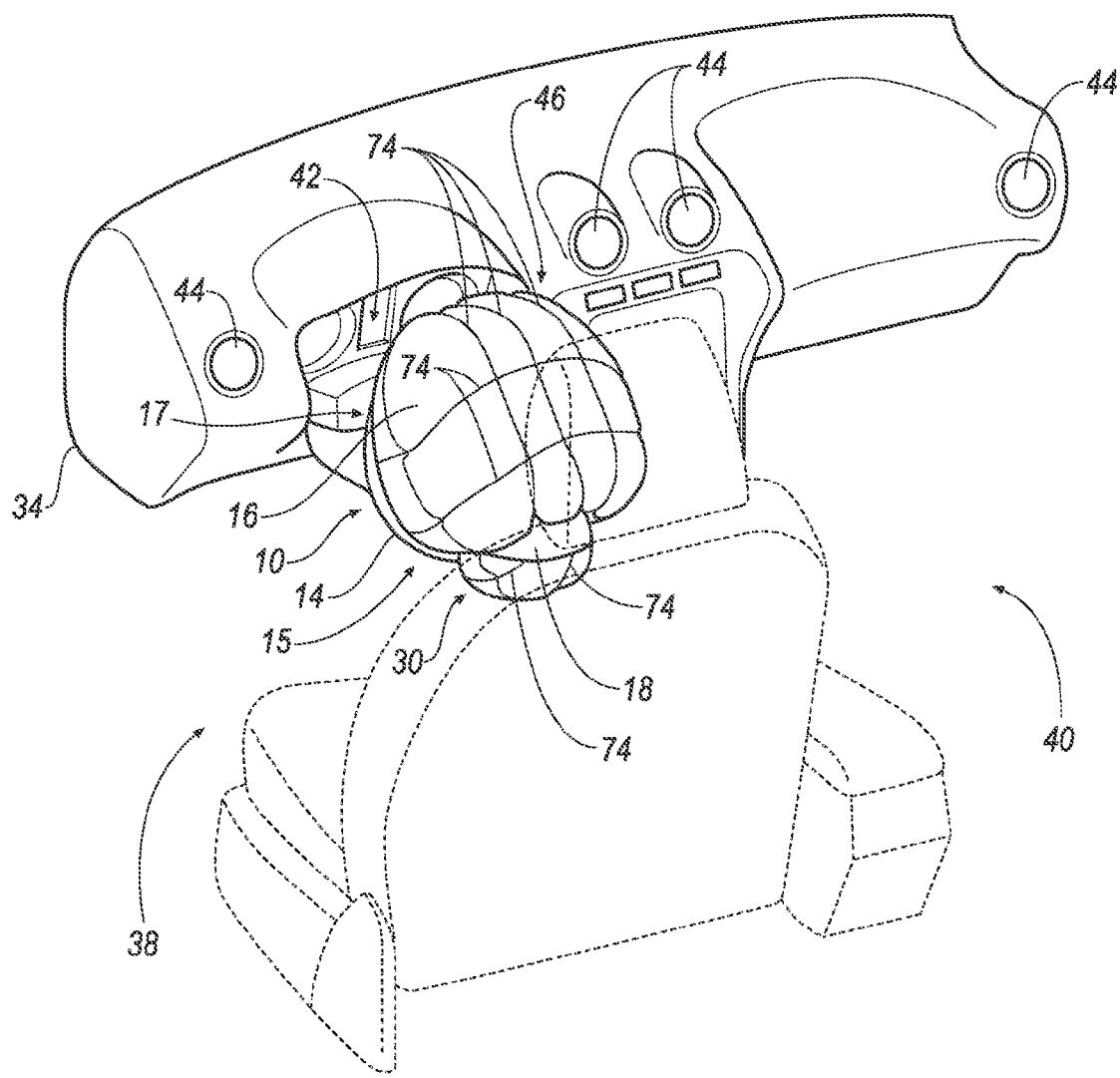
FIG. 2 is a perspective view of an airbag in an inflated position being tethered by an airbag tether and positioning tethers of the tether assembly.

With reference to the Figures, wherein like numerals indicate like parts throughout the several views, a steering wheel assembly 10 for a vehicle 12 includes a steering wheel 14 and an airbag 16 that is supported by the steering wheel 14. The airbag 16 is inflatable away from the steering wheel 14 in an inflation direction D, as shown in FIG. 1. With reference to FIGS. 2-3B, an airbag tether 18 includes a first end 20 coupled to the steering wheel 14, and a second end 22 spaced from the first end 20 and coupled to the steering wheel 14. The airbag 16 is disposed between the steering wheel 14 and the airbag tether 18.

As shown in FIG. 1, a driver 24 may be seated in front of the steering wheel assembly 10. The steering wheel 14 may be positioned adjacent to a thorax 26 of the driver 24 to facilitate holding and turning of the steering wheel 14 during operation of the vehicle 12. The steering wheel 14 may be positioned at an angle (not shown) to the vertical plane such that a lower portion 15 of the steering wheel 14 is closer to the thorax 26 than an upper portion 17 of the steering wheel 14. During a vehicle impact, e.g., a frontal impact of the vehicle 12, the airbag 16 may inflate to receive a head 28 and/or the thorax 26 of the driver 24 during forward movement of the driver 24 during the vehicle impact. The airbag tether 18 may restrain inflation of a portion of the airbag 16 during inflation, e.g., a lower section 30 of the airbag 16, as shown in FIG. 2, to reduce the magnitude of impact between the airbag 16 and the thorax 26 of the driver 24 during the forward movement of the driver 24 during the vehicle impact. Additionally, by having the airbag tether 18 external to the airbag 16, the mechanical complexity of the steering wheel assembly 10 may be reduced by avoiding complicated linkages and mechanisms. Moreover, the design of the airbag 16 may be simplified by eliminating integrated airbag tethers and/or airbag stitching. This reduction in mechanical complexity and the airbag design simplification may decrease cost and increase reliability and durability.

With reference to FIGS. 1-2, the vehicle 12 may, for example, include a steering column 32 and an instrument panel 34. The steering wheel assembly 10 may be mounted to the steering column 32. The instrument panel 34 may be disposed at the front of a passenger compartment 36 of the vehicle 12 and extend from a driver side 38 to a passenger side 40. The instrument panel 34 may have openings for the steering column 32, an instrument cluster 42, air vents 44, etc. The vehicle 12 may be of any suitable type, e.g., a car, truck, SUV, etc.

The steering wheel assembly 10 may include an airbag assembly 46, as shown in FIGS. 1-4. The airbag assembly 46 includes the airbag 16, an inflator 48 (shown schematically in FIG. 6), and a base 50. The steering wheel assembly 10 may include a steering wheel cover 52 concealing the airbag assembly 46, as shown in FIG. 1 (and shown removed in FIGS. 3A-B for illustrative purposes). The steering wheel cover 52 is disengaged from the steering wheel 14 when the airbag 16 is inflated.

The base 50 of the airbag assembly 46 may define a cavity that houses the airbag 16 in an uninflated position, as shown in FIGS. 1 and 3A-4. The base 50 may support the inflator 48, either inside or outside of the cavity.

The airbag assembly 46 may be positioned at the driver side 38 of the vehicle 12, i.e., for inflation and contact with the driver 24. For example, the base 50 may be mounted to the steering wheel 14 and/or the steering column 32 in any suitable manner. The airbag assembly 46, for example, may rotate with the steering wheel 14. As another example, the airbag assembly 46 may be positioned at the passenger side 40 of the vehicle 12, i.e., for inflation and contact with a passenger. For example, the base 50 may be supported on the instrument panel 34 at the passenger side 40. As yet another alternative, the base 50 may be mounted in any other suitable position in the vehicle 12.

The airbag assembly 46 may be a component of an impact sensing system 54. Specifically, as set forth further below for example, the impact sensing system 54 may sense an impact of the vehicle 12 and may trigger inflation of the airbag 16 in response to the sensed impact. In addition, the impact sensing system 54 may sense the type of impact, e.g., based on direction, magnitude, etc., and may trigger inflation of the airbag 16 in response to the type of impact.

The inflator 48 expands the airbag 16 with an inflation medium, such as a gas. The inflator 48 may be, for example, a pyrotechnic inflator that uses a chemical reaction to drive the inflation medium into the airbag 16. Alternatively, the inflator 48 may be, for example, a cold-gas inflator that, when activated, ignites a pyrotechnic charge that creates an opening for releasing the pressurized inflation medium to the airbag 16 via a fill tube. Alternatively, the inflator 48 may be of any suitable type, for example, a hybrid inflator.

During inflation of the airbag 16 from the uninflated position, as shown in FIGS. 1 and 3A-4, to an inflated position, as shown in FIG. 2, the airbag 16 may be inflatable away from the steering wheel 14 and/or the base 50 of the airbag assembly 46 in the inflation direction D, as shown in FIG. 1. Specifically, the inflation direction D extends generally in a vehicle-rearward direction from the steering wheel 14 and/or the base 50 of the airbag assembly 46.

The airbag 16 may be formed of any suitable type of material, e.g., from a woven polymer. For example, the airbag 16 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

Figure 3A:
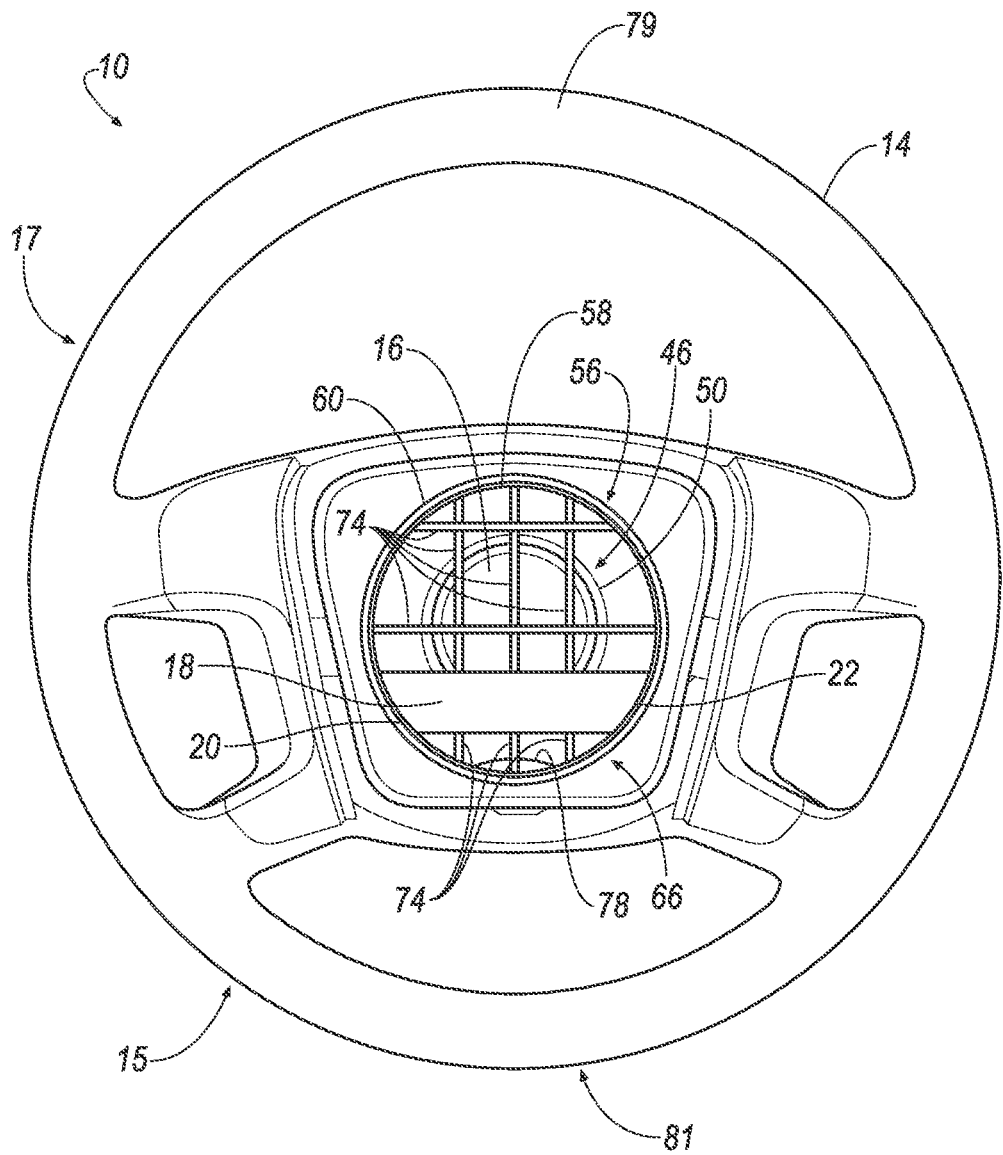
FIG. 3A is a front view of the steering wheel assembly including the airbag assembly and the tether assembly.
Figure 3B:
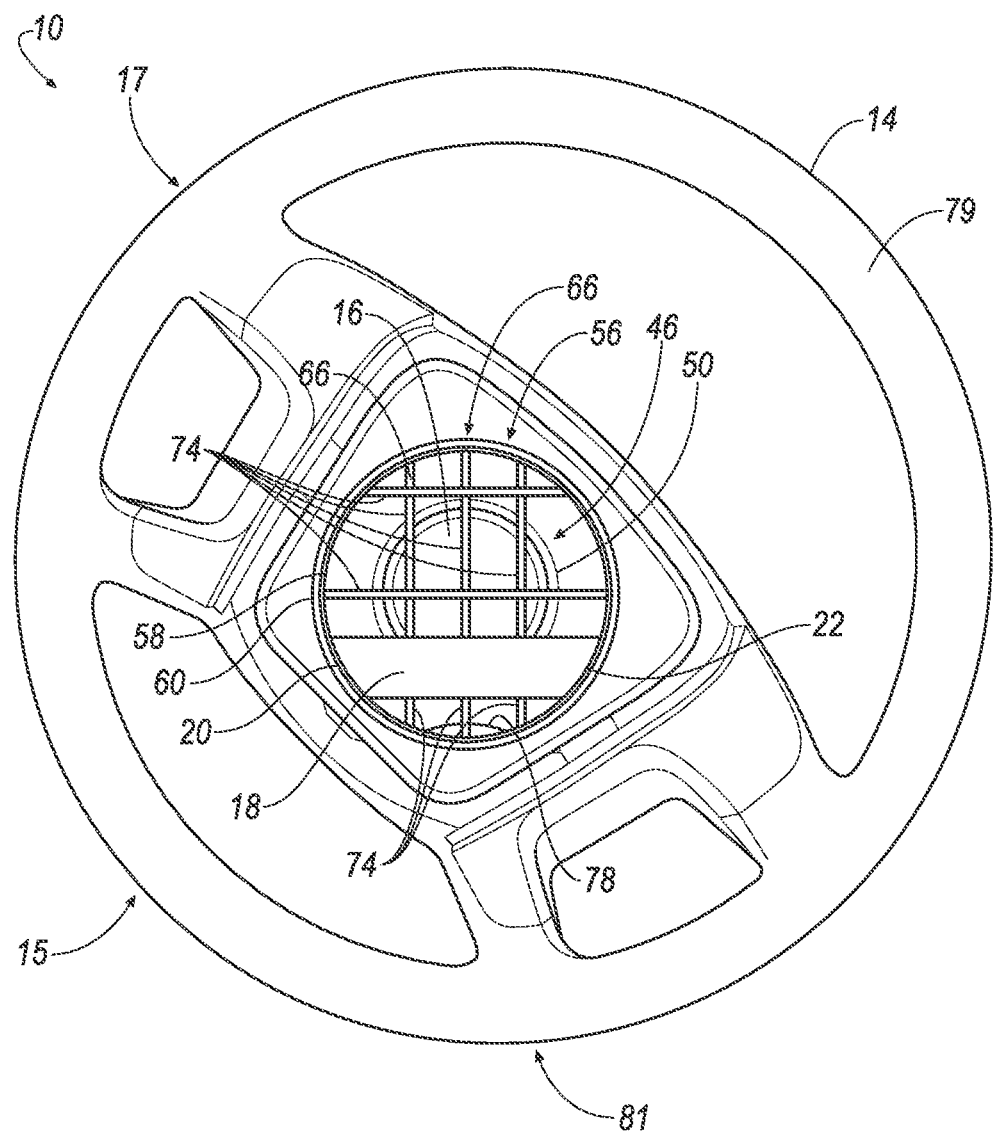
FIG. 3B is a front view of the steering wheel assembly in FIG. 3A with a steering wheel turned 45 degrees clockwise.
Figure 4:
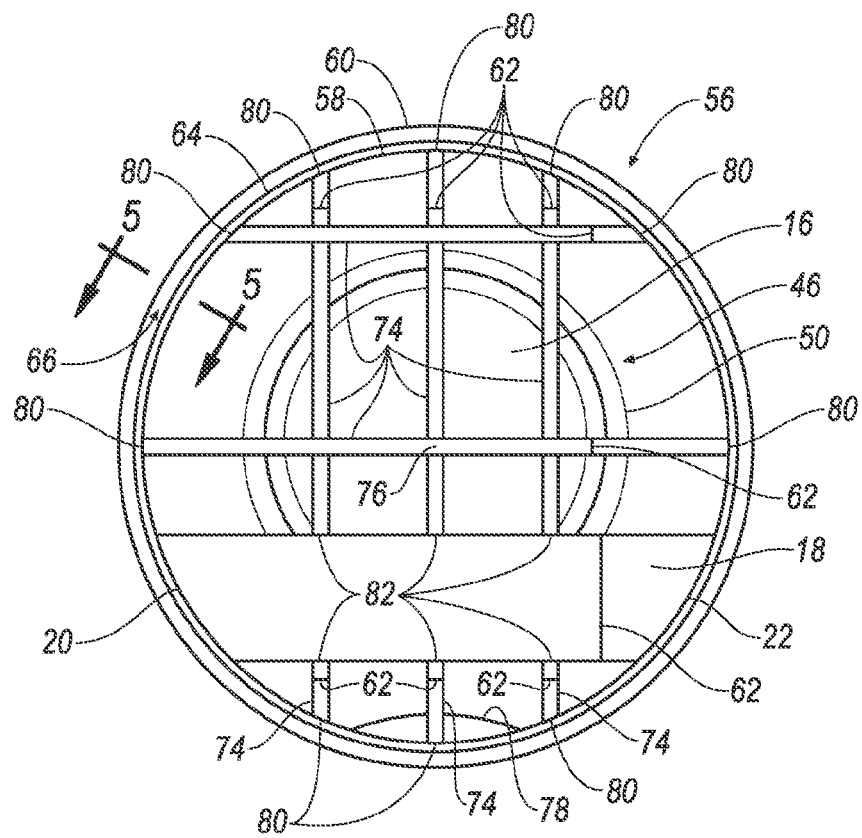
FIG. 4 is a front view of the airbag assembly and the tether assembly with the airbag tether and positioning tethers folded.

The steering wheel assembly 10 may include a tether assembly 56, as shown in FIGS. 1 and 3A-4, which includes the airbag tether 18. As shown in FIGS. 3A-4, the tether assembly 56 may include a first ring 58 and a second ring 60. The airbag tether 18 may be coupled to the first ring 58 of the tether assembly 56. Specifically, the airbag tether 18 may be directly connected to the first ring 58, as shown in FIGS. 3A-4. Alternatively, the airbag tether 18 may be coupled, i.e., directly or indirectly connected, to the steering wheel 14 and/or the base 50 of the airbag assembly 46.

The airbag tether 18 may be formed of an elastic material, i.e., the airbag tether 18 will return to its initial shape and size after being stretched. In this case, the airbag tether 18 may elastically deform when the airbag 16 moves from the uninflated position, as shown in FIG. 1, to the inflated position, as shown in FIG. 2. The elastic material may be, for example, natural rubber, synthetic rubber, polyester-rubber mixture, etc.

Alternatively, the airbag tether 18 may be formed of a non-elastic material, i.e., the airbag tether 18 resists elastic deformation. The non-elastic material may be, for example, woven nylon yarn, nylon 6, 6, polyester, etc.

The airbag tether 18 may be folded when the airbag 16 is in the uninflated position so that its effective length can be increased when the airbag 16 moves from the uninflated position to the inflated position. For example, one fold 62 is shown in FIG. 4. The airbag tether 18 may include any suitable number of folds 62 at any suitable location when the airbag 16 is in the uninflated position.

The second ring 60 may be fixed relative to the steering wheel 14 and/or the base 50 of the airbag assembly 46. For example, the second ring 60 may be fastened, adhered, welded, etc., to the steering wheel 14 and/or the base 50 of the airbag assembly 46.

As shown in FIGS. 1 and 3A-4 the first ring 58 may be rotatably supported by the steering wheel 14 and/or base 50 of the airbag assembly 46 via the second ring 60. In other words, the second ring 60 may be fixed to the steering wheel 14 and/or the base 50 of the airbag assembly 46, and the second ring 60 may be rotatably mounted to an outer peripheral surface 64 of the first ring 58.

The first ring 58 and second ring 60 may be circular. The diameter of the first ring 58 may be smaller than the diameter of the second ring 60. The first ring 58 and the second ring 60 may be formed of any suitable material, e.g., metal such as stainless steel, aluminum, etc. Alternatively, for example, the first ring 58 and the second ring 60 may be formed of a thermoplastic, e.g., polyoxymethylene (POM), polypropylene (PP), etc.

Figure 5:
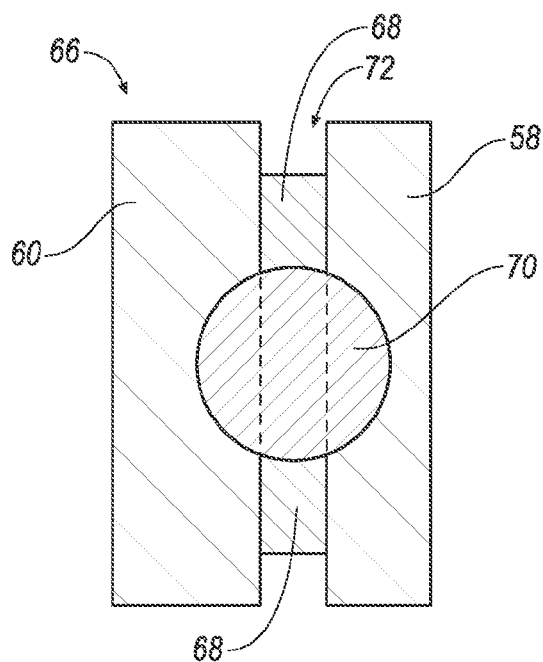
FIG. 5 is a cross-section view of a bearing of the tether assembly.

A rotatable mounting mechanism may be disposed between the first ring 58 and the second ring 60. For example, the rotatable mounting mechanism may be a bearing 66. The bearing 66 may be, for example, a thin section ball bearing, as shown in FIGS. 3A-4 and in cross-sectional view in FIG. 5. Alternatively, the bearing 66 may be any suitable type of bearing, e.g., a needle bearing, a roller bearing, etc. The bearing 66, e.g., the thin section ball bearing, may include the first ring 58, the second ring 60, a separator 68 and a plurality of balls 70 between the first ring 58 and the second ring 60. The balls 70 reduce rotational friction and transmit radial and axial loads between the first ring 58 and the second ring 60, which may allow the first ring 58 to freely rotate relative to the second ring 60. The separator 68 may evenly space the balls 70 around a circumferential gap 72 between the first ring 58 and the second ring 60. The balls 70 may be made of any suitable material, e.g., stainless steel, aluminum, glass, ceramic, etc. The separator 68 may be made of any suitable material, e.g., stainless steel, brass, phenolic resins, synthetic molded glass fibers, etc.

With reference to FIGS. 1 and 3A-4 and as set forth above, the first end 20 and the second end 22 of the airbag tether 18 are coupled to the first ring 58. For example, the first end 20 and the second end 22 may be coupled to the first ring 58 by fasteners, adhesion, ultrasonic welding, etc. Alternatively, the first end 20 and the second end 22 may be coupled to the first ring 58 by positioning tethers 74, as set forth below. As yet another alternative, and as set forth above, the airbag tether 18 may be coupled to the steering wheel 14 and/or the base 50 of the airbag assembly 46 in any suitable manner. The airbag tether 18 may be offset from a center 76 of the first ring 58. As shown in FIGS. 1 and 3A-4, the airbag tether 18 is elongated horizontally. Alternatively, the airbag tether 18 may be, for example, in any orientation offset from the center 76 of the first ring 58.

With reference to FIGS. 1 and 3A-4, the tether assembly 56 may include a ballast weight 78 fixed to the first ring 58. For example, the ballast weight 78 may be fixed to the first ring 58 by fasteners, adhesion, welding, integral formation, etc. The ballast weight 78 offsets the weight distribution of the first ring 58 about the center 76 of the first ring 58 such that gravitational force biases the first ring 58 to an equilibrium position relative to gravity, as shown in FIGS. 1 and 3A-4. In other words, the ballast weight 78 maintains the first ring 58 in the equilibrium position as the steering wheel 14 is rotated, as shown in FIGS. 3A-B. Accordingly, the airbag tether 18 is constantly maintained in the horizontal position shown in FIGS. 3A-B, i.e., even as the steering wheel 14 is rotated, so as to restrain inflation of the airbag 16 toward the thorax 26 of the driver 24. The ballast weight 78 may be formed of any suitable material, e.g., metal such as lead, steel, aluminum, etc.

The first ring 58 and the second ring 60 may extend in a common plane (not shown). The steering wheel 14 may extend in a plane (not shown) parallel to the plane of the first ring 58 and the second ring 60 such that the ballast weight 78 is along a lowest part 81 of a rim 79 of the steering wheel 14, as shown in FIGS. 1 and 3A-3B.

With reference to FIGS. 1-4, the tether assembly 56 may include at least one positioning tether 74. The positioning tether 74 positions the airbag tether 18 during inflation of the airbag 16. The positioning tether 74 may include a first tether end 80 and a second tether end 82 spaced from the first tether end 80. The first tether end 80 may be coupled, i.e., directly or indirectly connected, to the first ring 58 and/or another one of the positioning tethers 74, e.g., with stitching, fasteners, adhesive, welding, etc. The second tether end 82 may be coupled, i.e., directly or indirectly connected, to the airbag tether 18, e.g., with stitching, fasteners, adhesive, welding, etc.

The positioning tether 74 may be formed of an elastic material. In this case, the positioning tether 74 will elastically deform when the airbag 16 moves from the uninflated position, as shown in FIGS. 3A-3B to the inflated position, as shown in FIG. 2. Alternatively, the elastic deformation of the positioning tether 74 may be restricted by an inelastic component, e.g., inelastic threads attached to the positioning tether 74 to constrain the elastic deformation of the positioning tether 74. The elastic material may be, for example, natural rubber, synthetic rubber, polyester-rubber mixture, etc. As yet another alternative, the positioning tether 74 may be formed of an inelastic material. The inelastic material may be, for example, woven nylon yarn, nylon thread, nylon 6, 6, polyester, etc.

Figure 6:
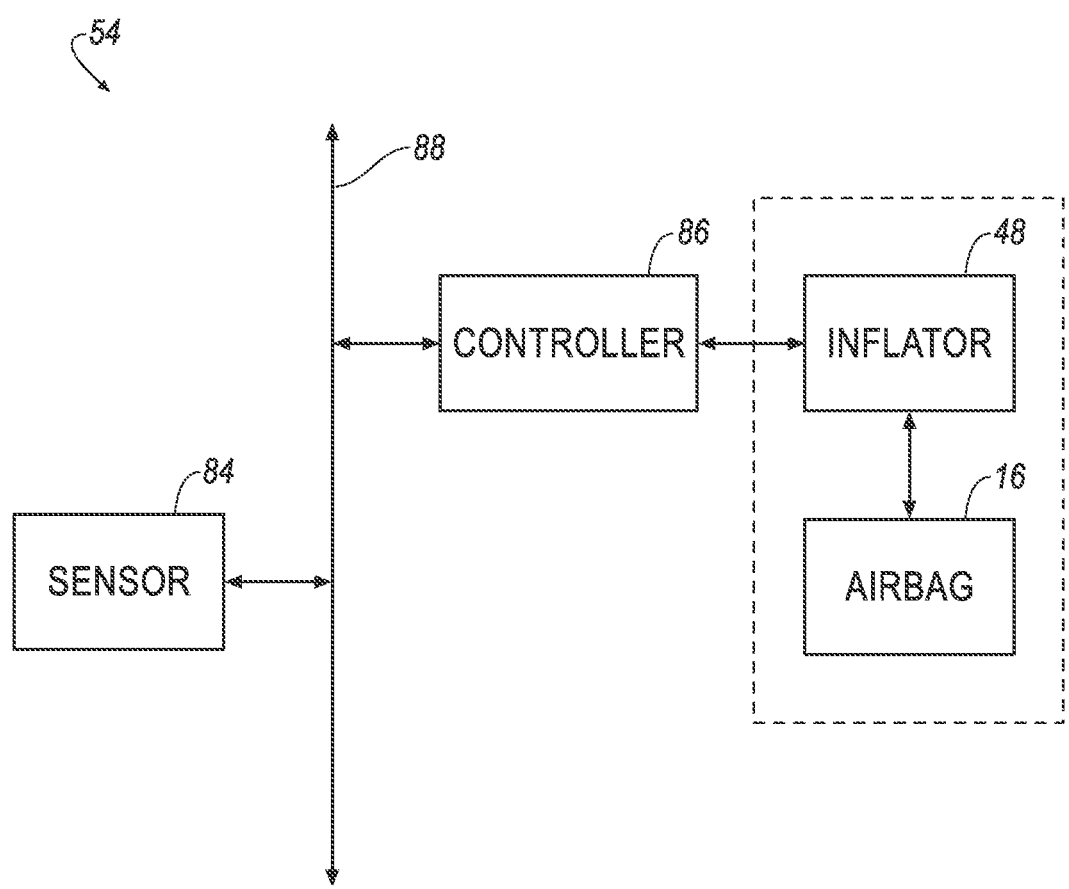
FIG. 6 is a schematic view of an impact sensing system of the vehicle.

As shown in FIG. 4, the positioning tether 74 may be folded, i.e., may include folds 62, when the airbag 16 is in the uninflated position so that the effective length of the positioning tether 74 can be increased when the airbag 16 moves from the uninflated position to the inflated position. The positioning tether 74 may include any suitable number of folds 62 at any suitable location when the airbag 16 is in the uninflated position A schematic of the impact sensing system 54 is shown in FIG. 6. The impact sensing system 54 may include at least one sensor 84 for sensing impact of the vehicle 12, and a controller 86 in communication with the sensor 84 and the inflator 48 for activating the inflator 48, e.g., for providing an impulse to a pyrotechnic charge of the inflator 48, when the sensor 84 senses an impact of the vehicle 12. Alternatively or additionally to sensing impact, the impact sensing system 54 may be configured to sense impact prior to impact, i.e., pre-impact sensing. The sensor 84 may be of any suitable type, e.g., using radar, lidar, and/or a vision system. The vision system may include one or more cameras, CCD image sensors, and/or CMOS image sensor, etc.

The controller 86 may be a microprocessor-based controller. The sensor 84 is in communication with the controller 86 to communicate data to the controller 86. Based on the data communicated by the sensor 84, the controller 86 instructs the inflator 48 to activate.

The controller 86 and the sensor 84 may be connected to a communication bus 88, such as a controller area network (CAN) bus, of the vehicle 12. The controller 86 may use information from the communication bus 88 to control the activation of the inflator 48. The inflator 48 may be connected to the controller 86, as shown in FIG. 6, or may be connected directly to the communication bus 88.

In operation, the airbag 16 is in the uninflated position, as shown in FIGS. 1 and 3A-4, under normal operating conditions of the vehicle 12. When the sensor 84 senses an impact of the vehicle 12, the impact sensing system 54 triggers the inflator 48 to inflate the airbag 16 with the inflation medium from the uninflated position to the inflated position. In particular, based on the type of impact sensed by the impact sensing system 54, the impact sensing system 54 inflates the airbag 16 to the inflated position, as shown in FIG. 2.

The disclosure has been described in an illustrative manner, and it is to be understood that the terminology, which has been used is intended to be in the nature of words of description rather than of limitation. Many modifications and variations of the present disclosure are possible in light of the above teachings, and the disclosure may be practiced otherwise than as specifically described.

What is claimed is:

1. A steering wheel assembly comprising:
a steering wheel;
an airbag supported by the steering wheel;
a unitary airbag tether including a first end and a second end spaced from the first end, the airbag being disposed between the steering wheel and the airbag tether;
a first ring rotatably supported by the steering wheel, the first end and the second end of the airbag tether being coupled to the first ring;
a second ring fixed relative to the steering wheel and rotatably supporting the first ring; and
a ballast weight fixed to the first ring;
wherein the first ring is circular and the airbag tether is offset from a center of the first ring toward the ballast weight.

2. The steering wheel assembly as set forth in claim 1, further comprising at least one positioning tether including a first tether end coupled to the first ring and a second tether end spaced from the first tether end and coupled to the airbag tether.

3. The steering wheel assembly as set forth in claim 1, wherein the airbag tether is formed of an elastic material.

4. The steering wheel assembly as set forth in claim 1, wherein the airbag tether is formed of a non-elastic material.

5. The steering wheel assembly as set forth in claim 1, wherein the airbag tether is free from direct attachment to the airbag.

6. The steering wheel assembly as set forth in claim 1, wherein the airbag is inflatable to an inflated position, and the airbag tether extends across the airbag in the inflated position.

7. An airbag assembly comprising:
a base;
an airbag supported by the base;
a unitary airbag tether including a first end and a second end spaced from the first end, the airbag being disposed between the base and the airbag tether;
a first ring rotatably supported by the base, the first end and the second end of the airbag tether being coupled to the first ring;
a second ring fixed relative to the base and rotatably supporting the first ring; and
a ballast weight fixed to the first ring;
wherein the first ring is circular and the airbag tether is offset from a center of the first ring toward the ballast weight.

8. The airbag assembly as set forth in claim 7, further comprising at least one positioning tether including a first tether end coupled to the first ring and a second tether end spaced from the first tether end and coupled to the airbag tether.

9. A tether assembly comprising:
a first ring;
a second ring rotatably mounted to the first ring;
a unitary airbag tether including a first end coupled to the first ring and a second end spaced from the first end and coupled to the first ring; and
a ballast weight fixed to the first ring;
wherein the first ring is circular and the airbag tether is offset from a center of the first ring toward the ballast weight.

10. The tether assembly as set forth in claim 9, further comprising a bearing between the first ring and the second ring.

11. The tether assembly as set forth in claim 10, further comprising at least one positioning tether including a first tether end coupled to the first ring and a second tether end spaced from the first tether end and coupled to the airbag tether.

12. The tether assembly as set forth in claim 9, wherein the airbag tether is formed of an elastic material.

\* \* \* \* \*